United States Patent
Li et al.

(10) Patent No.: US 11,757,297 B2
(45) Date of Patent: Sep. 12, 2023

(54) BATTERY MANAGEMENT ARCHITECTURES FOR FLOW BATTERIES

(71) Applicant: Nextracker LLC, Fremont, CA (US)

(72) Inventors: Chen Li, Fremont, CA (US); Yang Liu, Mountain View, CA (US); Jonathan Kenzo Kamei, Dublin, CA (US)

(73) Assignee: NEXTRACKER LLC, Fremont, CA (US)

( * ) Notice: Subject to any disclaimer, the term of this patent is extended or adjusted under 35 U.S.C. 154(b) by 0 days.

(21) Appl. No.: 18/075,317

(22) Filed: Dec. 5, 2022

(65) Prior Publication Data

US 2023/0170729 A1    Jun. 1, 2023

Related U.S. Application Data

(63) Continuation of application No. 16/436,710, filed on Jun. 10, 2019, now Pat. No. 11,522,383.

(Continued)

(51) Int. Cl.
*H01M 10/44* (2006.01)
*H01M 10/46* (2006.01)
(Continued)

(52) U.S. Cl.
CPC ............. *H02J 7/04* (2013.01); *H01M 4/368* (2013.01); *H01M 8/04902* (2013.01);
(Continued)

(58) Field of Classification Search
USPC .......................... 320/101, 102, 104, 106, 108
See application file for complete search history.

(56) References Cited

U.S. PATENT DOCUMENTS

| 5,897,973 A | 4/1999 | Stephenson et al. |
| 8,221,911 B2 | 7/2012 | Kumamoto et al. |

(Continued)

FOREIGN PATENT DOCUMENTS

| CA | 2995969 A1 | 5/2018 |
| CN | 203406794 U | 1/2014 |

(Continued)

OTHER PUBLICATIONS

Examination Report No. 1 issued in Australian Patent Application No. 2019282598 dated Sep. 30, 2021.

(Continued)

*Primary Examiner* — Brian Ngo
(74) *Attorney, Agent, or Firm* — Fredrikson & Byron, P.A.

(57) ABSTRACT

Systems and methods for managing flow batteries utilize a battery management controller (BMC) coupled between a flow battery and a DC/DC converter, which is coupled to an electrical grid or a photovoltaic device via an inverter. The inverter converts an AC voltage to a first DC voltage and the DC/DC converter steps down the first DC voltage to a second DC voltage. The BMC includes a first power route, a second power route, and a current source converter coupled to the second power route. The BMC initializes the flow battery with a third DC voltage using the current source converter until a sensing circuit senses that the voltage of the flow battery has reached a predetermined voltage. The sensing circuit may include a capacitor, which has a small capacitance and is coupled across each cell of the flow battery, coupled in series between two resistors having very large resistances.

16 Claims, 5 Drawing Sheets

Related U.S. Application Data

(60) Provisional application No. 62/682,481, filed on Jun. 8, 2018.

(51) Int. Cl.
*H02J 7/04* (2006.01)
*H02J 7/35* (2006.01)
*H02J 7/00* (2006.01)
*H01M 8/04858* (2016.01)
*H01M 4/36* (2006.01)
*H01M 8/18* (2006.01)
*H02S 20/32* (2014.01)

(52) U.S. Cl.
CPC .......... *H01M 8/188* (2013.01); *H02J 7/0068* (2013.01); *H02J 7/35* (2013.01); *H02S 20/32* (2014.12)

(56) References Cited

U.S. PATENT DOCUMENTS

| | | | |
|---|---|---|---|
| 10,305,286 | B2 | 5/2019 | Narla |
| 2005/0156431 | A1 | 7/2005 | Hennessy |
| 2012/0203392 | A1 | 8/2012 | Pandy et al. |
| 2015/0162635 | A1 | 6/2015 | Parakulam et al. |
| 2015/0380968 | A1* | 12/2015 | Lee ............ G06F 1/30 713/300 |
| 2016/0308488 | A1 | 10/2016 | Liu et al. |
| 2016/0336780 | A1* | 11/2016 | Lueth ............ H02J 7/34 |
| 2017/0207723 | A1* | 7/2017 | Zhang ............ H02M 1/12 |
| 2018/0054064 | A1 | 2/2018 | Narla et al. |

FOREIGN PATENT DOCUMENTS

| | | |
|---|---|---|
| CN | 103036286 B | 10/2014 |
| CN | 103595114 B | 7/2015 |
| CN | 103259059 B | 9/2015 |
| CN | 105637700 A | 6/2016 |
| DE | 102014100989 A1 | 7/2015 |

OTHER PUBLICATIONS

Examination Report No. 2 issued in Australian Patent Application No. 2019282598 dated Jul. 11, 2022.
Extended European Search Report issued in European Patent Application No. 19814650.8 dated Apr. 7, 2022.
First Examination Report issued in Indian Patent Application No. 202127000823 dated Jan. 5, 2022, with English translation, 6 pages.
PCT Search Report and Written Opinion issued in PCT Application No. PCT/US19/36396 dated Aug. 29, 2019, 18 pages.

* cited by examiner

BATTERY MANAGEMENT ARCHITECTURES FOR FLOW BATTERIES

CROSS-REFERENCE TO RELATED APPLICATIONS

This application is a continuation of U.S. patent application Ser. No. 16/436,710 filed Jun. 10, 2019, which claims the benefit of and priority to U.S. Application No. 62/682,481.

FIELD

The technology of this disclosure is generally related to managing flow batteries, for example, in conjunction with electrical energy generation and distribution systems.

BACKGROUND

A flow battery is a type of electrochemical cell where chemical energy is provided by two chemical components dissolved in two respective liquids separated by a membrane. Ion exchange, which is accompanied by flow of electric current, occurs through the membrane while the two liquids circulate in two respective volumes separated by the membrane.

A flow battery may be used like a rechargeable battery where an electric power source drives regeneration of the fuel. Flow batteries provide a variety of advantages over conventional rechargeable batteries including a flexible layout, a long cycle life, quick response times, and no harmful emissions. Because of these advantages, flow batteries may be used in a wide variety of applications. Such applications include storing energy from renewable sources such as solar for discharge during peak demand periods and load balancing where the flow battery is connected to an electrical grid to store excess electrical power during off-peak hours and release electrical power during peak demand periods.

SUMMARY

The techniques of this disclosure generally relate to managing flow batteries.

In one aspect, this disclosure features a system including a flow battery. The system also includes an inverter that converts an AC voltage from an electrical grid or a photovoltaic device to a first DC voltage. The system also includes a DC/DC converter coupled to the inverter. The DC/DC converter steps down the first DC voltage to a second DC voltage. The system also includes a battery management controller (BMC) coupled between the DC/DC converter and the flow battery. The BMC including a first power route, a second power route in parallel with the first power route, and a current source converter coupled to the second power route. The BMC initializes the flow battery with a third DC voltage using the current source converter.

In aspects, implementations of this disclosure may include one or more of the following features. The first DC voltage may range between 1200 volts and 1400 volts. The second DC voltage may range between 40 volts and 80 volts. The third DC voltage may range between 0 volts and 80 volts. The photovoltaic device may be a solar tracker. The BMC may include one or more power converters coupled to an output of the BMC. The BMC may include a semiconductor switch coupled to the first power route. The semiconductor switch may be turned off when the flow battery is initialized with a third DC voltage using the current source converter.

The BMC may include two switches coupled to respective terminals of the flow battery. The switches may switch between a connection to the first power route and a connection to the second power route. The two switches may switch to the connection to the second power route when the flow battery is initialized with a third DC voltage using the current source converter. The two switches may switch to the connection to the first power route when a voltage of the flow battery reaches a predetermined voltage. The predetermined voltage may be between 40 V and 65 V.

The system may also include multiple sensing circuits that sense voltages of multiple cells of the flow battery. Each sensing circuit of the sensing circuits may include a first resistor having a very large resistance, a capacitor having a small capacitance, and a second resistor having a very large resistance coupled in series between a voltage rail and ground. The capacitor may be connected across contacts of a cell of the multiple cells of the flow battery. The very large resistance may be between 1 Mohm and 10 Mohm. The small capacitance may be between 1 µF and 0.01 µF. The flow battery may be a vanadium, iron chromium, zinc bromine, or zinc iron flow battery.

The details of one or more aspects of the disclosure are set forth in the accompanying drawings and the description below. Other features, objects, and advantages of the techniques described in this disclosure will be apparent from the description and drawings, and from the claims.

BRIEF DESCRIPTION OF THE DRAWINGS

Various aspects of this disclosure are described herein below with reference to the drawings, which are incorporated in and constitute a part of this specification, wherein.

DETAILED DESCRIPTION

A system, architecture, and method are disclosed for integrating a solar tracker, a battery, an inverter, and a battery management controller to improve performance and costs. The system may incorporate a flow battery, such as an advanced vanadium flow battery (VFB). This disclosure provides an architecture that optimizes performance for commercial, industrial, agricultural, and utility applications, among other applications.

This disclosure relates to systems and architectures for seamlessly integrating solar systems, e.g., solar tracker systems, with flow batteries, such as vanadium flow batteries. Aspects of such systems are disclosed in, for example, U.S. Provisional Patent Application No. 62/667,129, filed May 4, 2018, and U.S. Provisional Patent Application No. 62/667,960, filed May 7, 2018, the entire contents of each of which are hereby incorporated by reference herein.

The system of this disclosure includes a battery management controller (BMC) to provide flow battery system control. In various aspects, the responsibility of the BMC includes providing power to all necessary functions to operate the vanadium flow battery.

Figure 1:
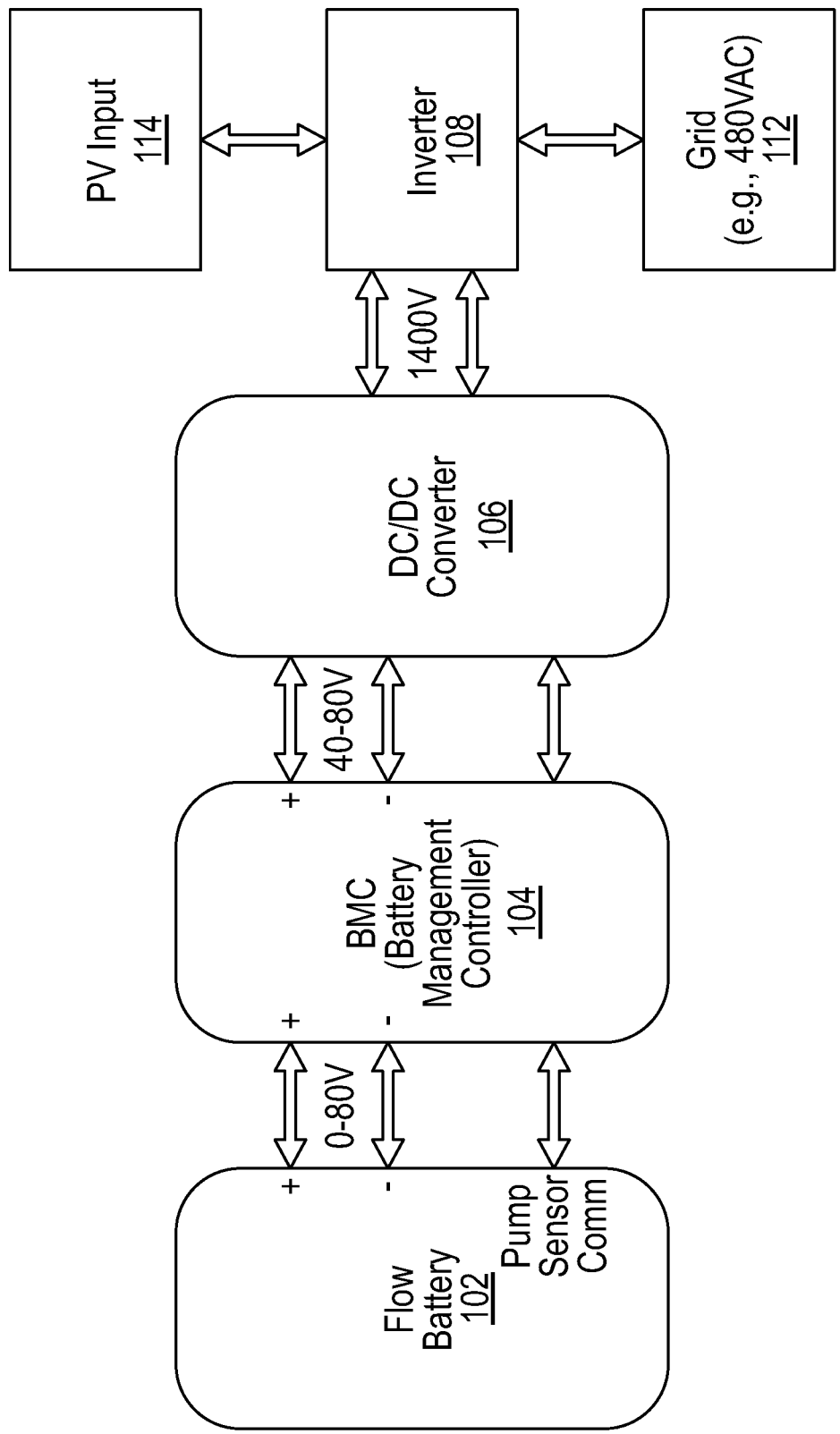
FIG. 1 is a block diagram of one aspect of the disclosed system.

FIG. 1 is a diagram of one aspect of the disclosed system, which includes a flow battery 102, a battery management controller (BMC) 104, a DC/DC converter 106, and an inverter 108. The inverter 108 can be coupled to an electrical grid 112, such as an industrial electrical grid that can provide, for example, 480 VAC, and/or to photovoltaics (PV) input 114.

The flow battery 102 will be described in more detail below herein. Generally, when the flow battery 102 is being initialized, the components 102, 104, 106, 108 of FIG. 1 operate from right to left. That is, power is provided from the electrical grid 112 and/or the PV input 114. The inverter 108 converts the AC voltage from the electrical grid 112 to a first DC voltage, for example, 1200-1400 VDC, and the DC/DC converter 106 steps down the DC voltage, to, for example, between 40-80 VDC. The BMC 104 uses this voltage to initialize the flow battery 102. This operation is described in more detail in connection with FIG. 3. In the illustrated aspect, the voltage at the terminals of the flow battery 102 can range between 0 and 80 volts.

The vanadium flow battery 102 allows the charge and discharge to take place entirely in the liquid phase. Since the energy is stored in liquid form, the batteries can effectively manage the heat that is generated inside the flow battery 102 during the charge-discharge cycle, thus preventing the possibility of accidental overheating and prolonging the service life. However, because the VFB energy is in liquid form, a pump is needed to move the liquid to generate voltage and current.

VFB systems have fewer components and have lower cost of ownership. VFBs are designed so that they do not degrade over the life cycle of the system. With conventional batteries, the electrodes degrade with each charge-discharge cycle, and the cells lose performance over time and must be replaced. VFBs, however, can generally operate as long as the application with which the VFBs are integrated—e.g., for 30 years or more in solar plants.

VFBs are also flexible. Because of the separation of the cells and electrolytes, the VFBs can be designed for either power or energy applications. As more flow battery cell stacks are added, the power is increased. Also, as the electrolyte tanks are enlarged, more energy is provided.

Figure 2:
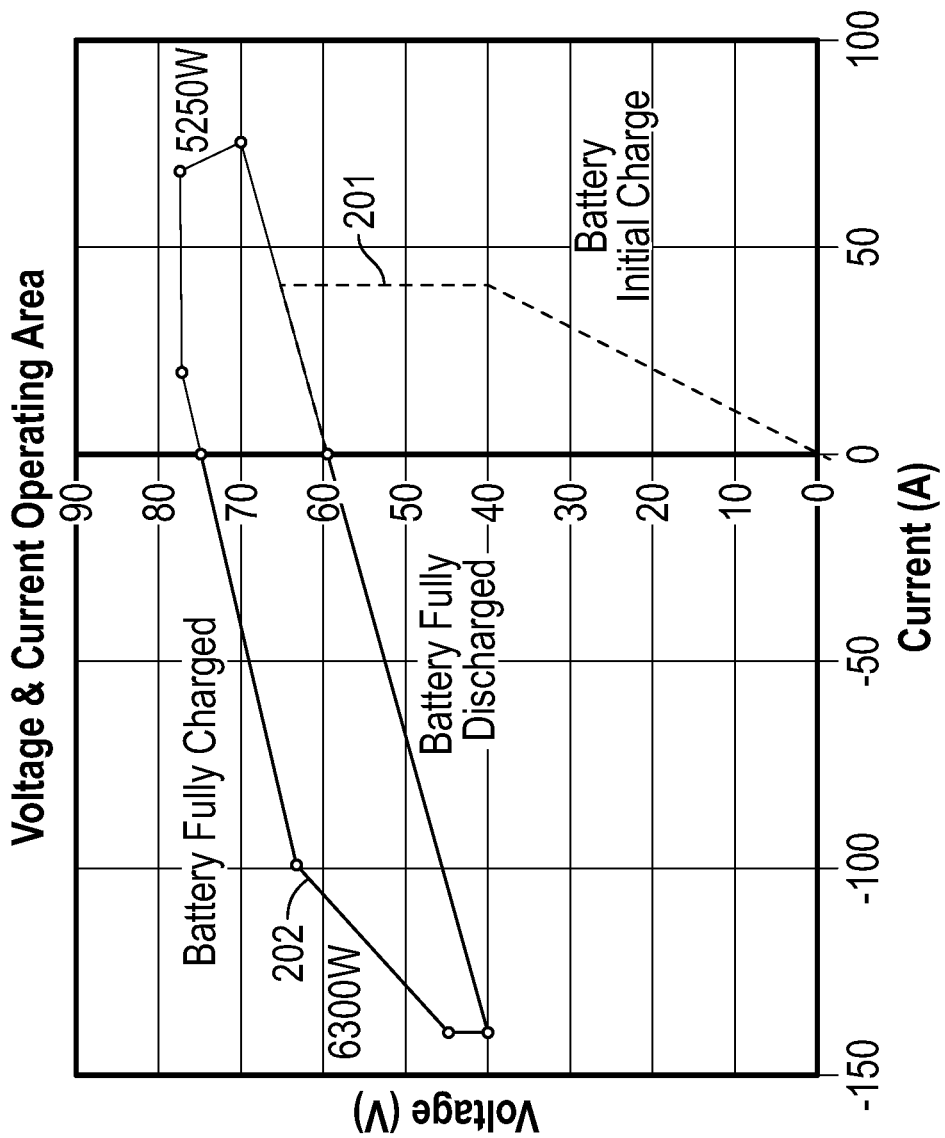
FIG. 2 is a graphical diagram of voltage and current operating characteristics of one aspect of a vanadium flow battery.

FIG. 2 is a graphical diagram of voltage and current operating characteristics of a vanadium flow battery. A VFB has a battery initial charge phase 201 and an operating phase 202. As mentioned above, movement of the VFB liquid generates the voltage and current. Without such VFB liquid movement initially, the initial voltage of the VFB may be as low as 0 VDC. The battery initial charge phase 201 of FIG. 2 illustrates that current is needed to increase the voltage of the VFB through the battery initial charge phase 201 to reach the operating phase 202. Thus, during the battery initial charge phase 201, the power flow in FIG. 1 flows from right to left, and power is obtained from the electrical grid 112 or PV device 114.

In the illustrated aspect, when the VFB voltage reaches about 40V, no further increase in current is needed to further increase the voltage through the battery initial charge phase 201 and reach the operating phase 202. Once the VFB reaches the operating phase 202, the VFB 102 can power the BMC 104, which operates to control the operation of the VFB 102. In various aspects, at least 24 V is needed to power the BMC 104 and for the BMC 104 to control operation of the flow battery 102.

Figure 3:
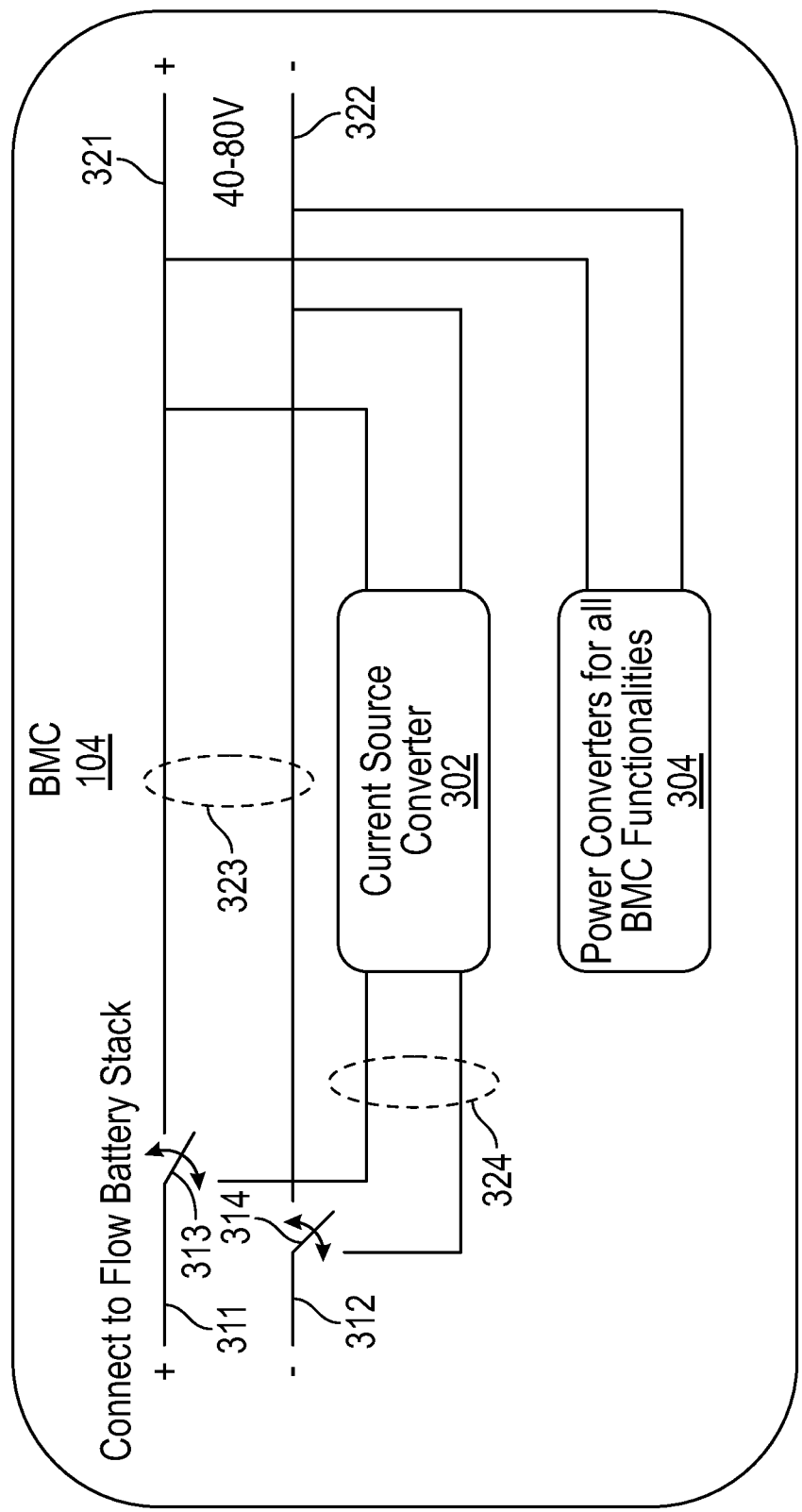
FIG. 3 is a block diagram of one aspect of certain components in the battery management controller (BMC) of FIG. 1.

FIG. 3 is a diagram of one aspect of certain components in the battery management controller 104 of FIG. 1. The left-side terminals 311, 312 connect to the VFB 102, and the right-side terminals 321, 322 connect to the DC/DC converter 106 of FIG. 1. A current source converter 302 outputs current with a voltage as low as 0V to initialize the flow battery 102 during the battery initial charge phase 201. The BMC 104 also includes one or more power converters 304 to provide the various voltage and current needs of the BMC 104.

The BMC 204 include two selectable power busses or routes—one power route 323 corresponding to the normal charge-discharge phase 202 and the other power route 324 corresponding to the battery initial charge phase 201. In aspects, the power routes 323, 324 may be implemented by power buses or any suitable electrical conductors for carrying power between the VFB 102 and the DC/DC converter 106.

When the VFB 102 is at the initial charge phase 201, the current source converter 302 is enabled and is connected to the VFB 102 by operating switches 313, 314 so that the switches 313, 314 connect to power route 324. In this mode, power from the electrical grid 112 or PV device 114, depending on PV device availability, flows into the right side of the BMC 104 and powers the current source converter 302, and the current source converter 302 is used to initialize the VFB 102. In this mode, the power converters 304 in the BMC 104 use the power from the electrical grid and/or PV device to power the BMC 104.

Once the initial charge phase 201 is completed, the current source converter 302 is disabled and is disconnected from the VFB by operating switches 313, 314 so that the switches 313, 314 disconnect from power route 324 and connect to power route 323. In various aspects, the current source converter 302 can be disabled when the voltage of the VFB 102 reaches about 40-65 V in the battery initial charge phase 201. The VFB 102 is then directly connected to the DC/DC converter 106. In this mode, the VFB 102 can be charged or can discharge and provide power to the electrical grid 112. In this operating mode, for example, the VFB 102 can be charged by energy from solar trackers via the PV input 114, or the VFB 102 can discharge to provide energy to the electrical grid 112. Depending on whether the VFB 102 is charging or discharging, the power converters 302 within the BMC 104 may be powered by different energy sources.

Figure 4:
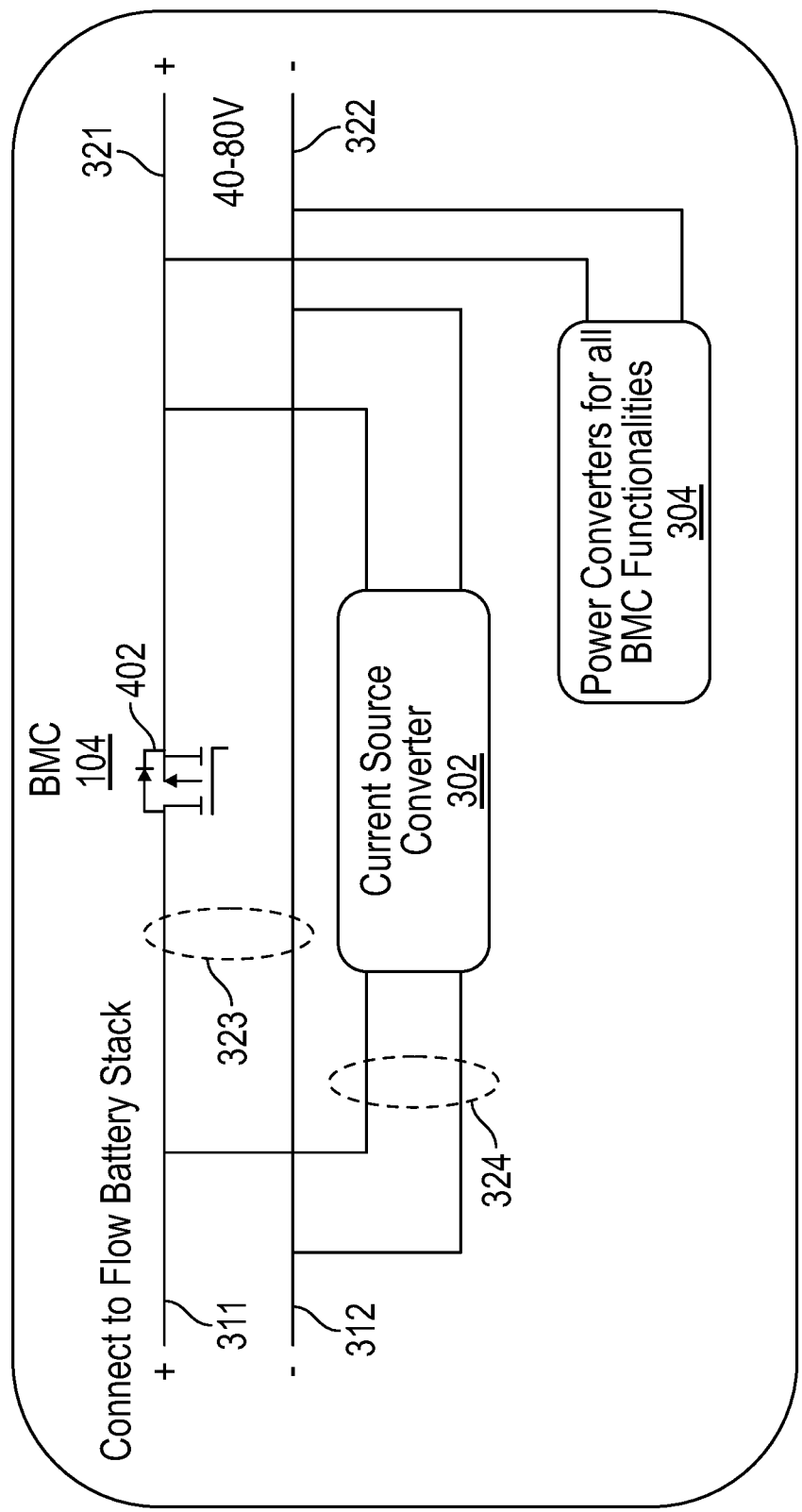
FIG. 4 is a block diagram of another aspect of the BMC of FIG. 1.

FIG. 4 shows another aspect of the BMC 104 of FIG. 1. When the VFB 102 is in the battery initial charge phase 201, the current source converter is enabled and the semiconductor switch 402, which may be a metal—oxide—semiconductor field-effect transistor (MOSFET) or any other suitable transistor, is turned off. Once the battery initial charge phase 201 is completed, the current source converter 302 is disabled and semiconductor switch 402 is turned on so that the VFB 102 is directly connected to the DC/DC converter 106. In various aspects, the semiconductor switch 402 can be turned on when the voltage of the VFB 102 reaches about 40-65V in the battery initial charge phase 201.

The architecture and components of FIGS. 1, 3, and 4, may not need an additional power supply to power the BMC 104 or an additional converter to operate the VFB 102.

Figure 5:
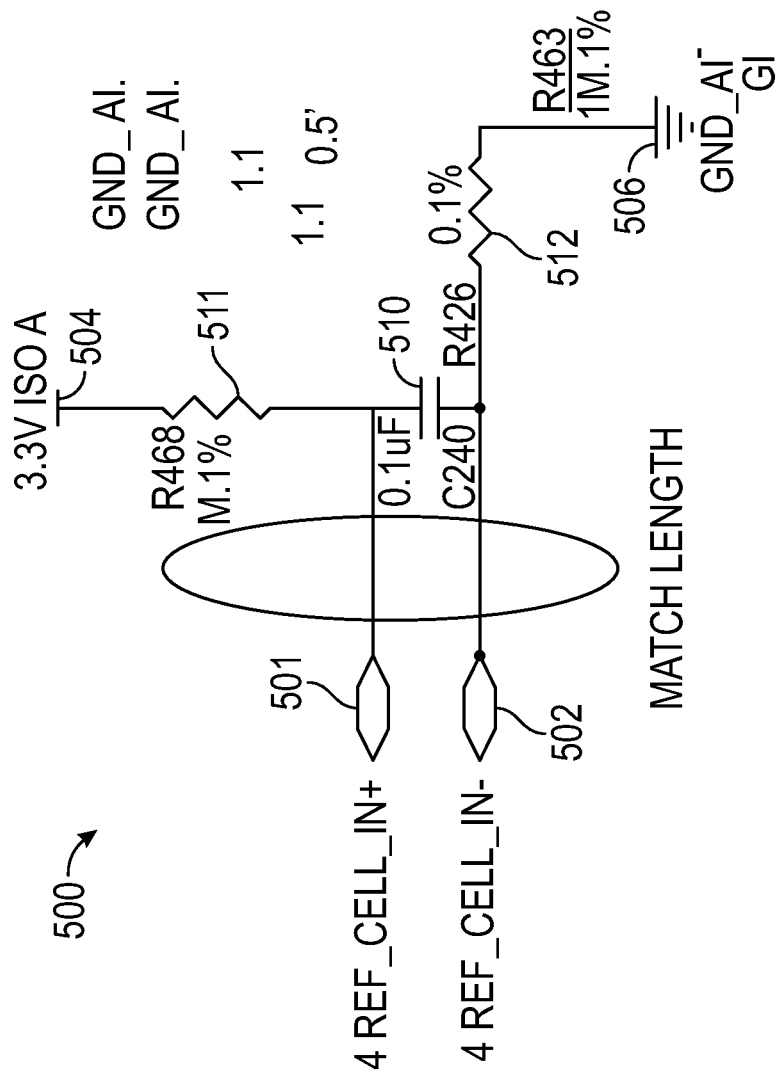
FIG. 5 is a circuit diagram of a sensing circuit for sensing the voltage of a cell in a flow battery stack.

FIG. 5 shows a sensing circuit 500 for sensing the voltage of a cell in a flow battery stack. The sensing circuit 500 can measure one cell of the VFB 102 through electrical contacts or terminals 501, 502 to sense the state of charge, and this measurement can be used by the BMC 104 to control the VFB 102. In various aspects, the sensing circuit 500 can be included in the BMC 104. In various aspects, the sensing circuit 500 can be outside the BMC 104 but can be connected to the BMC 104.

The sensing circuit 500 includes a voltage rail 504 that can provide a small voltage, for example, 3.3 VDC. The voltage at the voltage rail 504 can be provided by a power converter, e.g., one of the power converters 302, in the BMC 104, which may be an isolated power supply. The sensing circuit 500 also includes a ground connection 506. Connected between the voltage rail 504 and the ground connection 506 are, in series, a very large resistance 511, a small capacitance 510, and another very large resistance 512. In the illustrated aspect, the very large resistances 511, 512 are 1 Mohm and the small capacitance 510 is 0.1 µF. Other values and combinations of resistances and capacitances are contemplated to be within the scope of this disclosure. For example, the very large resistances of the resistors 511, 512 can be in the range of about 1 Mohm to 10 Mohm, and the capacitance of the capacitor 510 can be in the range of about 1 µF to 0.01 µF.

When the sensing circuit is disconnected from a VFB cell, the voltage across the capacitor may be 3.3 VDC. When the sensing circuit 500 is then connected to the VFB cell, the voltage across the capacitor 510 will decrease to the voltage of the VFB cell, which is typically in the range of −0.6 to 1.6 VDC. During this transition, a small amount of current flows into the VFB cell. Additionally, when the voltage across the capacitor 510 is less than 3.3 VDC, a small amount of current flows through the resistors 511, 512 corresponding to the voltage difference, and this small amount of current also flows through the VFB cell. When the voltage across the capacitor 510 reaches the voltage of the VFB cell, no current is provided by the capacitor 510, but a small current continues to flow through the resistors 511, 512 and through the VFB cell. Because the resistances of the resistors 511, 512 are very large, the current flowing through the resistors 511, 512 would be very small and would not perturb the VFB cell. For example, in the illustrated aspect of FIG. 5, the maximum current flow can be (3.3−(−0.6))/1000000=0.0000039=3.9 uA.

The sensing circuit 500 configured in the illustrated aspect can detect the voltage range of a typical VFB cell, which can be in the range of −0.6 to 1.6 VDC, while not disturbing the VFB cell. Additionally, the sensing circuit 500 can be used to detect that the VFB 102 is disconnected because the voltage across the capacitor would be about 3.3 VDC.

While several aspects of the disclosure have been shown in the drawings, it is not intended that the disclosure be limited thereto, as it is intended that the disclosure be as broad in scope as the art will allow and that the specification be read likewise. Any combination of the above aspects is also envisioned and is within the scope of the appended claims. Therefore, the above description should not be construed as limiting, but merely as exemplifications of particular aspects. Those skilled in the art will envision other modifications within the scope of the claims appended hereto.

Although the description above refers to a vanadium flow battery, other types of flow batteries can be used with the present disclosure. For example, flow batteries having other chemistries, including without limitation iron chromium, zinc bromine, or zinc iron, can be used in this disclosure. The flow batteries can also be redox, hybrid, or membraneless flow batteries.

What is claimed is:

1. A system comprising:
a flow battery;
an inverter coupled to an electrical grid and to a photovoltaic device, the inverter configured to convert an AC voltage from the electrical grid to a first DC voltage;
a DC/DC converter coupled to the inverter and configured to step down the first DC voltage to a second DC voltage;
sensing circuits configured to sense a voltage of respective cells of the flow battery, wherein each sensing circuit includes a voltage rail, a ground connection, a first resistor, a capacitor, and a second resistor, wherein the first resistor, the capacitor, and the second resistor are coupled in series between the voltage rail and the ground connection, wherein the capacitor is coupled across contacts of a cell of the flow battery, and wherein each sensing circuit detects that the flow battery is disconnected based on the voltage across the capacitor; and
a battery management controller (BMC) coupled between the DC/DC converter and the flow battery, the BMC being configured to initialize the flow battery with a third DC voltage.

2. The system of claim 1, wherein the first DC voltage ranges between 1200 volts and 1400 volts.

3. The system of claim 1, wherein the second DC voltage ranges between 40 volts and 80 volts.

4. The system of claim 1, wherein the third DC voltage ranges between 0 volts and 80 volts.

5. The system of claim 1, wherein the photovoltaic device is supported by a solar tracker.

6. The system of claim 1, wherein the BMC includes one or more power converters coupled to an output of the BMC.

7. The system of claim 1, wherein the first resistor and the second resistor have a resistance between 1 Mohm and 10 Mohm.

8. The system of claim 1, wherein the capacitor has a capacitance between 1 µF and 0.01 µF.

9. The system of claim 1, wherein the flow battery is a vanadium flow battery, an iron chromium flow battery, a zinc bromine flow battery, or a zinc iron flow battery.

10. The system of claim 1, wherein the BMC includes a first power route coupled between the DC/DC converter and the flow battery, a second power route in parallel with the first power route and coupled between the DC/DC converter and the flow battery, and a current source converter coupled to the second power route.

11. The system of claim 10, wherein the BMC includes a semiconductor switch coupled to the first power route, and wherein the semiconductor switch is turned off when the flow battery is initialized with the third DC voltage using the current source converter.

12. The system of claim 10, wherein the BMC includes two switches coupled to respective terminals of the flow battery and configured to switch between a connection to the first power route and a connection to the second power route, and
wherein the two switches are configured to switch to the connection to the second power route when the flow battery is initialized with a third DC voltage using the current source converter.

13. The system of claim 12, wherein the two switches are configured to switch to the connection to the first power route when a voltage of the flow battery reaches a predetermined voltage.

14. The system of claim 13, wherein the predetermined voltage is between 40 V and 65 V.

15. The system of claim 10, wherein the BMC is configured to initialize the flow battery using the current source converter.

16. The system of claim 1, wherein after the flow battery is initialized, the flow battery is charged by the photovoltaic device and the flow battery discharges to the electrical grid.

\* \* \* \* \*